(12) United States Patent
Moore

(10) Patent No.: US 9,545,097 B2
(45) Date of Patent: Jan. 17, 2017

(54) DEVICE TO ATTRACT DEER

(71) Applicant: Jeremy Frank Moore, Pulaski, WI (US)

(72) Inventor: Jeremy Frank Moore, Pulaski, WI (US)

(*) Notice: Subject to any disclaimer, the term of this patent is extended or adjusted under 35 U.S.C. 154(b) by 0 days.

(21) Appl. No.: 14/556,599

(22) Filed: Dec. 1, 2014

(65) Prior Publication Data
US 2015/0082681 A1 Mar. 26, 2015

Related U.S. Application Data

(63) Continuation of application No. 12/903,636, filed on Oct. 13, 2010, now Pat. No. 8,938,905.

(60) Provisional application No. 61/252,241, filed on Oct. 16, 2009.

(51) Int. Cl.
| | | |
|---|---|---|
| *A01M 31/06* | (2006.01) | |
| *A01M 31/00* | (2006.01) | |
| *A41G 1/00* | (2006.01) | |

(52) U.S. Cl.
CPC .......... *A01M 31/008* (2013.01); *A01M 31/06* (2013.01); *A41G 1/007* (2013.01)

(58) Field of Classification Search
CPC ..... A01M 31/06; A01M 31/00; A01M 31/008
USPC .......... 43/1–3; 248/511, 519, 523, 527, 530; 239/57, 34, 44, 53, 54, 56
See application file for complete search history.

(56) References Cited

U.S. PATENT DOCUMENTS

| | | | | |
|---|---|---|---|---|
| 354,509 A | * | 12/1886 | Grimm | A23G 3/50 426/104 |
| 659,089 A | * | 10/1900 | McKinney | B60B 33/0002 248/160 |
| 843,588 A | * | 2/1907 | Ditto | A01M 31/06 43/3 |
| 1,473,612 A | * | 11/1923 | Dewey | A01M 31/06 43/3 |
| 1,828,892 A | * | 10/1931 | Felton | E01F 9/0118 116/173 |
| 2,231,485 A | * | 2/1941 | Straight | A44C 15/00 428/17 |
| 2,327,403 A | * | 8/1943 | Coupanger | A47G 33/1206 248/523 |
| 2,481,559 A | * | 9/1949 | Ashbaugh | A01K 1/04 119/797 |
| 2,536,736 A | * | 1/1951 | Gazalski | A01M 31/06 43/3 |

(Continued)

*Primary Examiner* — Darren W Ark
(74) *Attorney, Agent, or Firm* — McKee, Voorhees & Sease, PLC

(57) ABSTRACT

A deer attracting device and/or a kit incorporating the same facilitates luring deer to a specific location. The device includes a base that is supported from below by an underlying ground surface and a lock that holds a visual lure in an upright position, extending away from the base, so that deer can easily see the visual lure. A scent carrier may be applied to the visual lure and is configured to entice deer to apply their own scent(s) to the visual lure by scent marking or licking the lure. This encourages other deer to do the same after being visually drawn close enough to the visual lure to detect the scent. Correspondingly, the deer maintain or replenish the scent of the lure mitigating the need for a human to artificially do the same. The visual lure is maintained in position on the base be a column within which a lower end of the visual lure is received, and a lock that maintains the visual lure within the column.

3 Claims, 2 Drawing Sheets

(56) References Cited

U.S. PATENT DOCUMENTS

| | | | | |
|---|---|---|---|---|
| 2,613,899 A * | 10/1952 | Wagner | A47G 33/12 | 248/346.03 |
| 2,783,155 A * | 2/1957 | Haug | A47G 33/08 | 426/104 |
| 2,787,074 A * | 4/1957 | Miller | A01M 31/06 | 43/3 |
| 2,959,354 A * | 11/1960 | Beck | A01M 31/00 | 119/711 |
| 3,046,192 A * | 7/1962 | Bilyen | A01M 31/00 | 239/56 |
| 3,057,733 A * | 10/1962 | Frost | A23L 25/25 | 426/251 |
| 3,119,586 A * | 1/1964 | Hoffman | A47G 33/126 | 248/511 |
| 3,485,640 A * | 12/1969 | Johnson | B44D 2/00 | 426/251 |
| 3,573,143 A * | 3/1971 | Baus | A41G 1/00 | 248/530 |
| 3,768,192 A * | 10/1973 | Caccamo | A01M 31/06 | 43/3 |
| 3,928,712 A * | 12/1975 | Sears | A41G 1/00 | 428/17 |
| 4,061,306 A * | 12/1977 | Taylor | A47G 33/1213 | 248/523 |
| 4,183,579 A * | 1/1980 | Gonzalez y. Rojas | A61B 19/28 | 248/171 |
| 4,569,151 A * | 2/1986 | Hoffbeck | A47G 33/12 | 248/519 |
| 4,667,430 A * | 5/1987 | Ziese, Jr. | A01M 31/008 | 119/711 |
| 4,773,178 A * | 9/1988 | Marek | A01M 31/06 | 43/1 |
| 4,852,288 A * | 8/1989 | Payne | A01M 31/06 | 43/2 |
| 4,940,018 A * | 7/1990 | Edling | A01K 15/025 | 119/708 |
| 4,969,599 A * | 11/1990 | Campbell | A01M 31/008 | 239/47 |
| 5,002,252 A * | 3/1991 | Setala | A47G 33/12 | 248/523 |
| 5,029,408 A * | 7/1991 | Smith | A01M 31/06 | 43/1 |
| 5,083,708 A * | 1/1992 | Walters | A01M 29/12 | 239/55 |
| 5,098,057 A * | 3/1992 | Gran | E02D 5/801 | 248/156 |
| D325,617 S * | 4/1992 | Smith | D22/125 | |
| 5,209,450 A * | 5/1993 | Grapes | A47G 33/12 | 248/523 |
| 5,299,376 A * | 4/1994 | Roberts | A01M 31/008 | 222/510 |
| 5,307,584 A * | 5/1994 | Jarvis | A01M 31/008 | 239/51.5 |
| 5,335,438 A * | 8/1994 | Terrill | A01M 31/06 | 43/1 |
| 5,379,545 A * | 1/1995 | Gall | A01M 31/008 | 239/57 |
| 5,380,568 A * | 1/1995 | Banschick | A01G 5/04 | 428/17 |
| 5,515,637 A * | 5/1996 | Johnson | A01M 31/06 | 43/2 |
| 5,546,692 A * | 8/1996 | Byers | A01M 31/06 | 43/1 |
| 5,555,663 A * | 9/1996 | Burgeson | A01M 31/008 | 239/53 |
| 5,611,165 A * | 3/1997 | Blaha | A01M 31/008 | 239/58 |
| 5,618,548 A * | 4/1997 | Dawson | A01M 31/008 | 424/405 |
| 5,622,314 A * | 4/1997 | Eason | A61L 9/12 | 239/44 |
| 5,632,110 A * | 5/1997 | Roy | A01M 31/06 | 43/2 |
| 5,666,767 A * | 9/1997 | Ohba | A01M 29/26 | 116/22 A |
| 5,683,762 A * | 11/1997 | Banschick | A01G 5/04 | 428/23 |
| 5,746,019 A * | 5/1998 | Fisher | A01M 31/008 | 239/145 |
| 5,826,364 A * | 10/1998 | Bitting | A01M 31/06 | 43/2 |
| D402,170 S * | 12/1998 | Cox | D8/1 | |
| 5,857,281 A * | 1/1999 | Bergquist | A01M 31/008 | 239/47 |
| 5,914,119 A * | 6/1999 | Dawson | A01N 25/20 | 424/40 |
| 5,987,800 A * | 11/1999 | Regan | A01M 31/008 | 43/1 |
| 6,003,261 A * | 12/1999 | French | A01M 31/04 | 43/1 |
| 6,085,989 A * | 7/2000 | Cox | A01M 31/008 | 239/59 |
| 6,092,322 A * | 7/2000 | Samaras | A01M 31/06 | 43/2 |
| 6,102,301 A * | 8/2000 | Tiedemann | A61L 9/12 | 220/916 |
| 6,158,668 A * | 12/2000 | Burgeson | A01M 31/008 | 222/187 |
| 6,199,311 B1 * | 3/2001 | Foster | A01M 31/008 | 102/506 |
| 6,209,252 B1 * | 4/2001 | McGough | A01M 31/008 | 43/1 |
| 6,216,382 B1 * | 4/2001 | Lindaman | A01M 31/06 | 248/156 |
| 6,233,861 B1 * | 5/2001 | DelVecchio | A01M 31/008 | 43/1 |
| 6,241,161 B1 * | 6/2001 | Corbett | A01M 31/008 | 222/187 |
| 6,306,471 B1 * | 10/2001 | Pitman | A01M 31/00 | 135/901 |
| 6,371,432 B1 * | 4/2002 | Tsappi | A01G 9/124 | 248/158 |
| 6,374,529 B1 * | 4/2002 | Petroski | A01M 31/06 | 43/3 |
| 6,399,126 B1 * | 6/2002 | Weldon, Jr. | A23G 3/563 | 426/132 |
| 6,510,644 B1 * | 1/2003 | Gollnik | A01M 31/06 | 43/1 |
| 6,543,175 B1 * | 4/2003 | Tucker | A01M 31/00 | 42/94 |
| 6,574,902 B1 * | 6/2003 | Conger | A01M 31/06 | 43/2 |
| 6,634,132 B2 * | 10/2003 | Lorenz | A01M 31/06 | 43/2 |
| 6,658,782 B2 * | 12/2003 | Brint | A01M 31/06 | 43/2 |
| 6,698,132 B1 * | 3/2004 | Brint | A01M 31/06 | 43/2 |
| 6,712,286 B2 * | 3/2004 | Baxter | A01M 31/008 | 239/36 |
| 6,745,950 B1 * | 6/2004 | Longo | A01M 31/008 | 239/145 |
| 6,843,702 B2 * | 1/2005 | Weiser | A01M 31/06 | 40/417 |
| 6,857,215 B1 * | 2/2005 | Rickrode | A01M 31/06 | 43/2 |
| 6,857,579 B2 * | 2/2005 | Harris | A01M 1/2044 | 239/211 |
| 6,863,251 B1 * | 3/2005 | Gretz | E04H 12/003 | 248/156 |
| 6,901,693 B1 * | 6/2005 | Crowe | A01M 31/06 | 43/2 |
| 6,938,370 B2 * | 9/2005 | Johns | A01G 9/124 | 248/156 |
| 7,047,992 B1 * | 5/2006 | Fluellen | E04H 12/2223 | 135/136 |

(56) References Cited

U.S. PATENT DOCUMENTS

| | | | | |
|---|---|---|---|---|
| 7,051,681 B2* | 5/2006 | Pope | A01K 15/02 | 119/711 |
| 7,051,839 B1* | 5/2006 | George | F41H 3/00 | 43/1 |
| 7,073,732 B2* | 7/2006 | Abbas | A01M 31/008 | 239/302 |
| 7,093,770 B1* | 8/2006 | Moran | A01K 15/02 | 206/37 |
| 7,108,199 B1* | 9/2006 | Brown | A01M 1/2038 | 222/642 |
| 7,163,082 B2* | 1/2007 | Bigard | A01M 31/02 | 182/100 |
| 7,325,358 B1* | 2/2008 | Chalupsky | A01M 29/12 | 239/34 |
| 7,419,102 B2* | 9/2008 | Harris, Jr. | A01M 1/2044 | 239/145 |
| 7,441,365 B2* | 10/2008 | Brunner | A01M 31/06 | 43/1 |
| 7,549,248 B1* | 6/2009 | Luster | A01M 31/06 | 40/412 |
| 7,562,487 B2* | 7/2009 | Barr | A01M 31/06 | 43/2 |
| 7,758,278 B2* | 7/2010 | Tamburro | E01C 11/222 | 248/530 |
| 7,814,700 B2* | 10/2010 | Groth | A01M 31/06 | 273/403 |
| 8,082,689 B2* | 12/2011 | Eggleston | A01M 31/06 | 43/2 |
| 8,424,778 B2* | 4/2013 | Mount | A01M 1/2044 | 43/1 |
| 8,938,905 B1* | 1/2015 | Moore | A01M 31/06 | 239/34 |
| 9,185,902 B1* | 11/2015 | Mazzei, Sr. | A01M 31/025 | |
| 2001/0013212 A1* | 8/2001 | Jimenez Sanchez | A41G 1/001 | 52/426 |
| 2005/0199740 A1* | 9/2005 | Harris | A01M 1/2044 | 239/34 |
| 2006/0102737 A1* | 5/2006 | Harmon | A01M 1/2055 | 239/6 |
| 2006/0143970 A1* | 7/2006 | Lindaman | A01M 31/06 | 43/2 |
| 2006/0169793 A1* | 8/2006 | Price | A61L 9/14 | 239/34 |
| 2006/0233920 A1* | 10/2006 | Johnson | A23G 3/563 | 426/104 |
| 2006/0289668 A1* | 12/2006 | Szymczak | A61L 9/12 | 239/36 |
| 2007/0140923 A1* | 6/2007 | Wiegand | A01M 1/2055 | 422/124 |
| 2007/0145225 A1* | 6/2007 | Bondy | E04H 12/2223 | 248/530 |
| 2007/0251135 A1* | 11/2007 | Watlov | A01M 31/06 | 43/3 |
| 2008/0190008 A1* | 8/2008 | Aslin | A01M 31/008 | 43/1 |
| 2008/0290243 A1* | 11/2008 | Bonnema | A01K 39/012 | 248/533 |
| 2009/0039230 A1* | 2/2009 | Cheng | A47G 33/12 | 248/523 |
| 2009/0152380 A1* | 6/2009 | Houseknecht | B05B 3/0486 | 239/390 |
| 2009/0178326 A1* | 7/2009 | Suter | A01M 31/025 | 43/1 |
| 2009/0179082 A1* | 7/2009 | Price | A61L 9/14 | 239/36 |
| 2009/0320396 A1* | 12/2009 | Knudsen | E04H 12/2269 | 52/297 |
| 2010/0050494 A1* | 3/2010 | Zampetis | A01M 31/002 | 43/2 |
| 2010/0200724 A1* | 8/2010 | Kukuk | A45B 25/00 | 248/530 |
| 2010/0218412 A1* | 9/2010 | Williams | A01M 31/06 | 43/2 |
| 2011/0073671 A1* | 3/2011 | Mount | A01M 1/2044 | 239/44 |
| 2011/0139949 A1* | 6/2011 | Duerr | A01M 31/00 | 248/222.14 |
| 2011/0278371 A1* | 11/2011 | Rydbom | A61L 9/12 | 239/34 |
| 2012/0042561 A1* | 2/2012 | Bain | A01M 31/06 | 43/3 |
| 2012/0193442 A1* | 8/2012 | Broderick | A01M 31/008 | 239/34 |
| 2014/0123538 A1* | 5/2014 | Matheson | F16M 13/02 | 43/2 |
| 2015/0251809 A1* | 9/2015 | Jasin | F41H 3/00 | 220/8 |
| 2016/0153627 A1* | 6/2016 | Dennis | F21S 4/001 | 362/249.16 |

* cited by examiner

DEVICE TO ATTRACT DEER

CROSS-REFERENCE TO RELATED APPLICATIONS

This is a Continuation Application of U.S. Ser. No. 12/903,636 filed Oct. 13, 2010, which application claims priority to U.S. Provisional Patent Application Ser. No. 61/252,241 filed on Oct. 16, 2009, all of which are incorporated by reference herein.

BACKGROUND OF THE INVENTION

1. Field of the Invention

The invention relates to hunting and wildlife accessories and, more particularly, to deer attracting aids.

2. Discussion of the Related Art

It is well known that hunting and observing deer are popular activities. It is also known that to see deer, stalking techniques in which the hunter or observer tries to approach the deer is extremely difficult since deer have keen senses for detecting predators.

It is therefore often desirable to try luring deer or attracting them to a predetermined location for hunting or observing. Naturally attracting deer by providing, for example, a food plot near a hunting blind or observation blind is one common technique. However, food plots are typically large and a hunter or observer may not be able to readily see deer in certain portions of plots that are furthest from a blind.

Attempts have been made to attract deer to more specific locations than to general locations like food plots in order to increase the likelihood that the hunter or observer will have a clear line of sight to the deer at such specific location. These attempts include providing bait, minerals, and artificial scents to attract the deer to specific locations. These techniques can be expensive, time consuming, and may not be permitted in certain hunting or observing jurisdictions.

SUMMARY OF THE INVENTION

The present inventor has recognized that regular replenishing activities for maintaining baits, minerals, and artificial scents, at particular locations creates predator-like pressures upon the deer.

The present inventor recognized that deer may react to these pressures by reducing activity and at times even temporarily fleeing or "bumping" to different locations. The present inventor has further recognized that over time, deer will learn the schedule of the hunter's or observer's regular replenishing activities. The deer may then start patterning the hunter's or observer's own schedules for replenishing activities and "bump" to other locations or reduce activity levels accordingly. The present inventor has therefore developed a device for attracting deer to a specific location that is minimally invasive to deer habitat, is easily portable and can be quickly assembled, and which requires very little human maintenance and replenishing over time. The device capitalizes on a deer's curiosity to initially attract it near the device and then further capitalizes on a deer's olfactory sensitivity to entice it to investigate a scent on the device once it is near. The deer may be further enticed to leave its own scent on the device by scent marking, licking, or otherwise. This may encourage other deer to do the same, whereby with a nominal amount of human activity or presence, the device may function as an auto-regenerating communal scent post for the deer.

Specifically, in accordance with an aspect of the invention, at least one of these desires is fulfilled by providing a deer attracting device that includes abuse that is supported from below by a ground surface and a lock that is connected to the base. The lock defines a locked position and an unlocked position. A visual lure is removably held by the lock and extends upwardly from the base so that it can be viewed by deer. When the lock is in the locked position, the visual lure is retained in the device. When the lock is in the unlocked position, the visual lure can be readily withdrawn or removed from the device. This modular configuration may enhance portability and ease of assembly and dissemble of the device. This could be desirable because the device may have to be transported relatively far distances into a woods, field, or other suitable location for use.

In accordance with another aspect of the invention, the visual lure may be at least one of a tree, a portion of a tree, a replica of a tree, and a replica of a portion of a tree. Such configuration may provide a substantially natural appearance to the visual lure, so as to not appear overly-foreign and perhaps startling to the deer. Correspondingly, by placing the device so that it is sufficiently spaced from other trees the visual lure may be visually conspicuous and easily recognizable by the deer.

In accordance with another aspect of the invention, the visual lure is configured to and/or capable of receiving a scent carrier emitting a deer attracting scent. The visual lure can maintain the scent carrier thereon for extended periods of time, for example, four hours, eight hours, twelve hours, or more. While the scent carrier is maintained on the visual lure, the scent carrier continues to emit the deer attracting scent to an extent that is detectable by the deer. The scent carrier may resemble or be made from at least one of a glandular secretion, a pheromone, a foodstuff, which may entice deer to scent mark upon or lick the visual lure. Doing so leaves the deer's own scent in addition to and/or in place of that of the scent carrier. This may encourage further investigation of the visual lure by other deer. Such other deer may also be enticed into scent marking and/or licking the visual lure. This activity may continue so that the device serves as, for example, an auto-regenerating communal scent post.

In accordance with another aspect of the invention, the device includes a column that extends upwardly from the base and interconnects the base and the lock. The column may be transversely flexible in a manner that allows the visual lure to bend toward the ground and restore to its initial upright position. The column may be a coil spring that concentrically accepts an end of the visual lure therein to hold the visual lure in the upright position. By spacing the lock from the base with the column, the visual lure can be supported through a relatively large supporting interface between it and the rest of the device, which may enhance stability.

In accordance with another aspect of the invention, the lock includes a collar having a longitudinally extending central bore. A width of the collar bore may be about three-inches or less to accommodate relatively small trees, if trees are being used as the visual lures. A setscrew may extend through the collar and being radially movable into and out of the collar bore. In such configuration, (i) the locked position of the lock is defined when the setscrew is moved inwardly into the collar bore, and (ii) the unlocked position of the lock is defined when the setscrew is moved outwardly from the collar bore. The setscrew may be configured for tool-less operation by, for example, having a thumbscrew configuration or a knob at its outer end that can be turned by hand. The tool-less operation of the lock may shorten the amount of time required to assemble and disassemble the device.

In accordance with another aspect of the invention, the device includes at least one stake that extends downwardly from the base and inserts into the ground, so as to hold the base in a fixed location upon the ground. The stake may have a length that is at least two-times that of the column and which may be at least one-half of an overall length or height of the device. The stake may have an irregular outer surface that interlocks with the ground when the stake is inserted into the ground. The irregular outer surface of the stake may be defined by ribs that extend outwardly from the stake and are spaced from each other along the length of the stake. In some implementations, each stake may be made from a piece of rebar typically used for reinforcing concrete or masonry, or from similar stock and of similar size. The stake may have a substantially flat cap welded or otherwise affixed to its upper end. The cap may prevent the stake from pulling through the base during use. The substantial length and irregular outer surface characteristics of the stake can provide a stronger gripping interface between the stake and the ground, enhancing the anchoring function of the stake.

In accordance with another aspect of the invention, the device may be part of a kit for attracting deer to a particular location. The kit may include the device itself and the corresponding visual lure and also the scent carrier that emits a deer attracting scent, allowing a user to set up the device as an auto-regenerating communal scent post for deer. The kit may be used to attract deer to a particular location for observation by a hunter or a wildlife watcher. Or, the kit may be used to attract deer to a particular location so as to discourage their presence at other locations, for example to attract deer away from ornamental sapling trees or other decorative landscaping that the deer might otherwise bother.

Various other features, embodiments, and alternatives of the present invention will be made apparent from the following detailed description taken together with the drawings. It should be understood, however, that the detailed description and specific examples, while indicating preferred embodiments of the invention, are given by way of illustration and not limitation. Many changes and modifications could be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which.

DETAILED DESCRIPTION OF THE PREFERRED EMBODIMENTS

Figure 1:
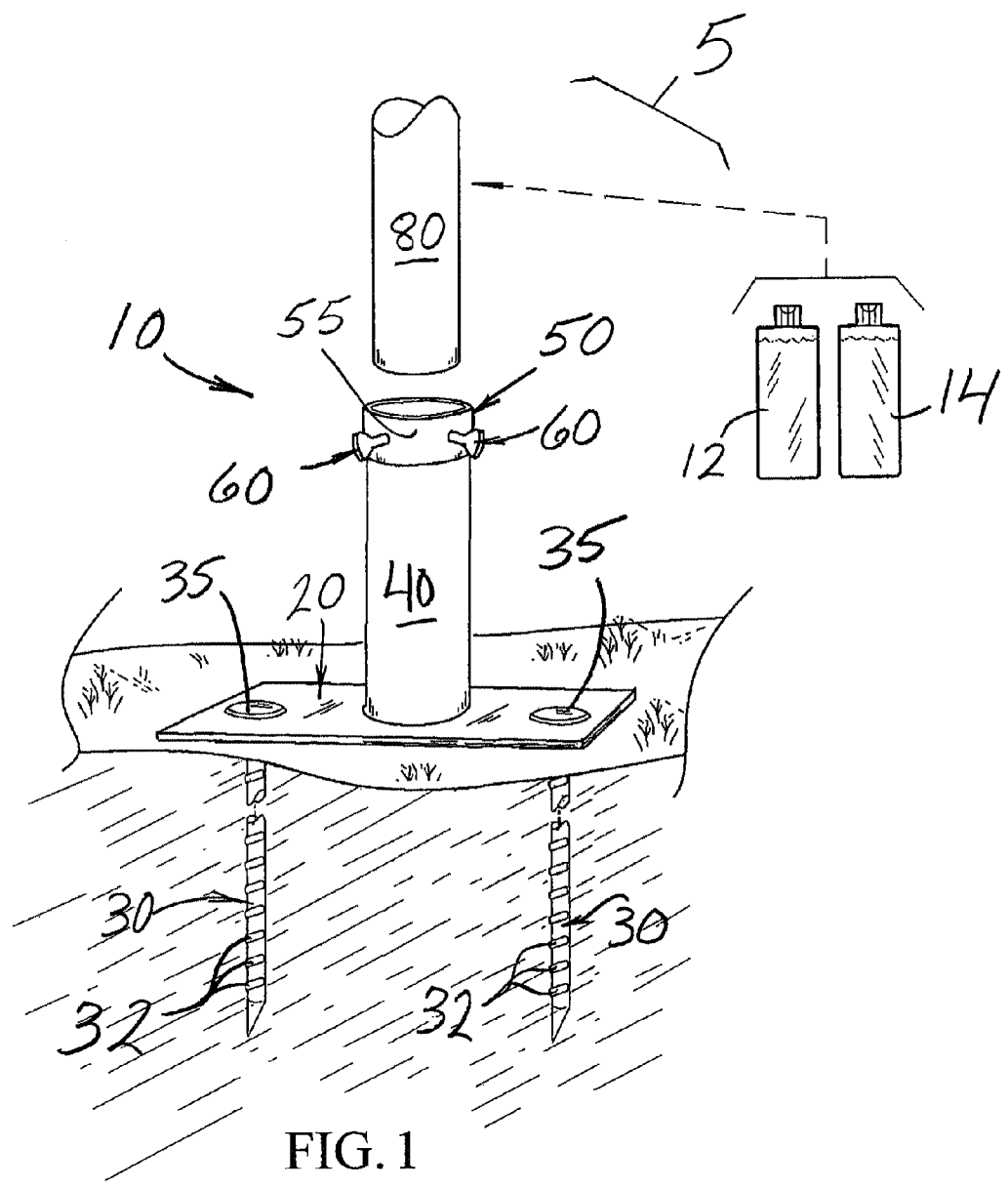
FIG. 1 is a pictorial view of a deer attracting kit in accordance with the present invention.
Figure 2:
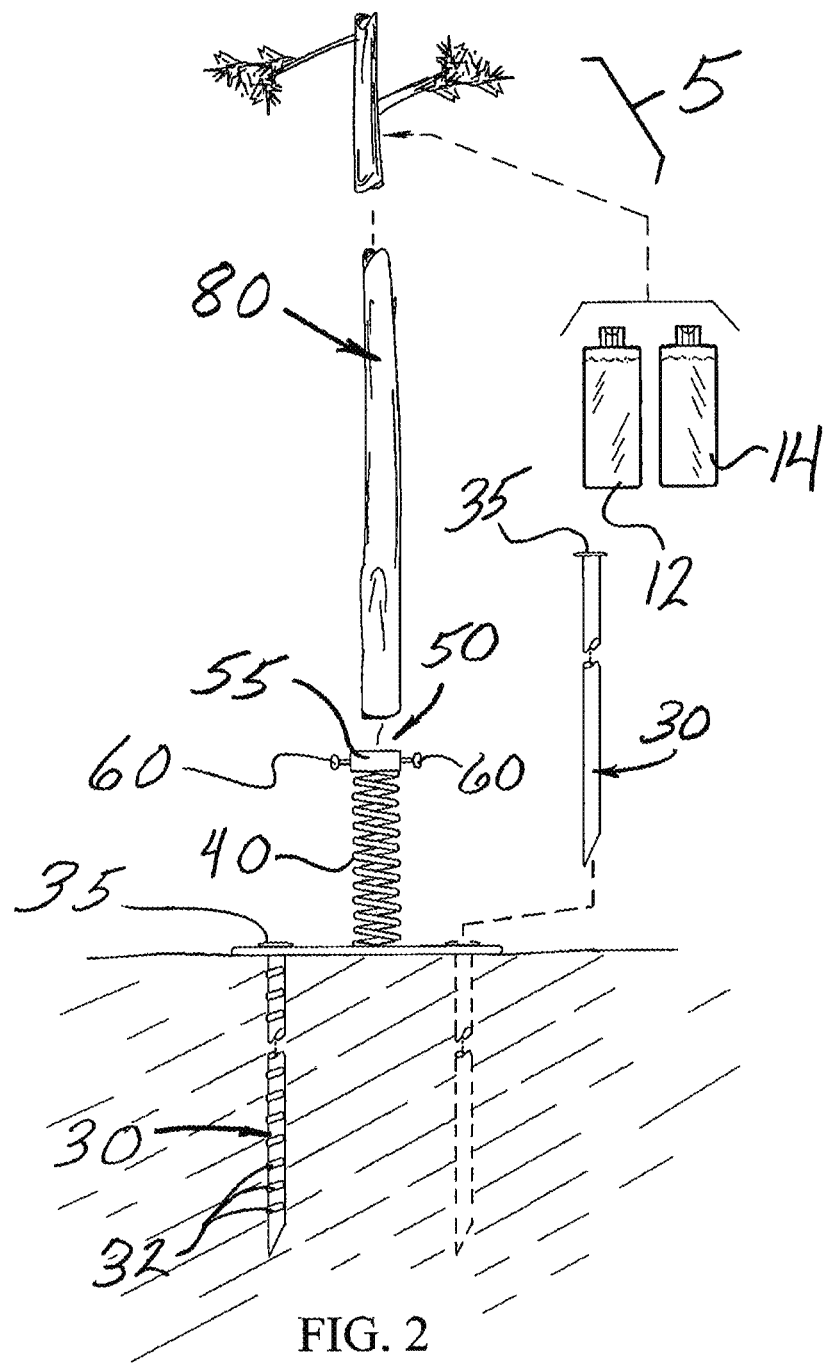
FIG. 2 is a side elevation view of a variant of the deer attracting device of the kit of FIG. 1.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims. Referring initially to FIGS. 1 and 2, the drawings illustrate exemplary embodiments of deer attracting systems of the invention, shown as kits 5. Each kit 5 has a deer attracting device 10 and one or more scent carriers 12, 14. The deer attracting device 10 is visually conspicuous to deer and visually entices the deer into approaching the device 10. After approaching the device 10, the scent carriers 12, 14 further entice the deer into applying their own scent to the device 10 by scent marking or licking, explained in greater detail elsewhere herein.

Referring now to FIG. 1, deer attracting device 10 of this embodiment includes a base 20 that is supported from below by a ground surface and a lock 50 that removably holds a visual lure 80 so that it stands upright and can be easily seen by deer. Base 20 is substantially planar and has a lower surface that sits directly on the ground surface and an upper surface that faces away from the ground. The dimensions of base 20 are selected to provide a lower surface area that correspondingly gives a footprint against, or interface with, the ground. This large surface area helps the base 20 resist puncturing into the ground due to, e.g., the weight of the overall device 10 and also gives tipping-negating stability to the device 10. In one embodiment, the lower surface of base 20 has a surface area of at least about thirty-six square inches, more preferably at least about fifty square inches. In one embodiment, the base 20 has a square perimeter shape with dimensions of about six inches by six inches with a thickness dimension of about ¼ inch or ⅛ inch.

Still referring to FIG. 1, in this embodiment, two mounting holes 22 extend through the entire thickness of base 20, on opposing sides of the base 20. The mounting holes 22 are provided near the perimeter edge of the base 20, for example, each being within two inches or preferably within one inch of the perimeter edge. The particular configuration of mounting holes 22 is based on characteristics of the stakes 30 that extend through the holes 22 to anchor the base 20 to the ground. For example, a single mounting hole 22 may be provided for versions of base 20 that use only a single stake 30, whereas more that two mounting holes 22 are provided for versions of base 20 that use more than two stakes 30. The inside diameter (ID) of the holes 22 is large enough to accommodate the stakes 30 therethrough, preferably only having about a ⅛ inch clearance between the ID surface of the mounting holes 22 and the stakes 30 to prevent or reduce sloppiness in the joint and/or stake-to-base rattling sounds during use. In another embodiment, no mounting holes 22 are provided in the base 20 and instead the stake(s) 30 is fixed, attached, or joined to the base 20.

Still referring to FIG. 1, stake 30 is an elongate pin that is driven into and anchors the base 20 to the ground. The dimensions of stakes 30 are selected to provide a substantial amount of surface area against the abutting ground surface to create a large amount of withdrawal-preventing friction therebetween. In one embodiment, stake 30 has a length that is at least two-times that of portion of the device 10 that sits above the ground, whereby the stake 30 is at least one-half of the overall length or height of the entire device 10. In one embodiment, the stake 30 is at least about 16 inches long and has a width or diameter of at least about ½ inch, which provides sufficient surface area for anchoring most implementations of the device 10 to the ground.

Referring still to FIG. 1, stake 30 may have an irregular or discontinuous outer surface to enhance its anchoring characteristics. In this embodiment, the irregular outer surface of the stake 30 is defined by ribs 32 that extend outwardly from its shaft portion and are spaced from each other along its length. In one embodiment, the stake 30 is made from a piece of reinforcing bar (rebar) stock that is commonly used to reinforce concrete or masonry, and that is cut to length and ground to a point or sharpened on its lower end. At its upper end, a cap 35 is fixed to the shaft of the stake 30. Cap 35 is wider than the ID of the corresponding mounting hole 22. Preferably the cap 35 is thin, rising less than about ⅛ inch from the upper surface of the base 20 when the stake 30 is fully inserted into the ground.

Referring yet further to FIG. 1, in this embodiment, a column 40 extends between the base 20 and the lock 50, elevating the lock 50 with respect to the base 20. Column 40 is in the form of a cylindrical tube that is fixed to and extends generally orthogonally upward from the middle of the upper surface of the base 20.

Referring now to FIG. 2, column 40 of this embodiment is transversely flexible, relative to its longitudinal axis, in a manner that allows the visual lure 80 to bend toward the ground and then restore to its initial upright position. The column 40 of this embodiment is a coil spring, shown here as a compression spring. It is noted that while a compression spring is shown, in some embodiments, the flexible versions of column 40 may be tension springs, non-coiled springs, or other suitably flexible, preferably resiliently flexible, structures that can attach the base 20 and lock 50 to each other while providing restorative forces to return the visual lure 80 to an upright position after being bent downwardly.

Referring now to FIGS. 1 and 2, lock 50, which sits at the top of the column 40 of these embodiments, defines a locked position and an unlocked position. In the locked position, lock 50 retains the visual lure 80 in it, whereas in the unlocked position, the visual lure 80 can be removed from the lock 50. In the embodiment shown in FIG. 1, the lock 50 includes a collar 55 and setscrews 60 that extend through the collar 55 into a longitudinally extending bore of the collar 55. In one embodiment, the diameter of the collar bore is about three inches or less, although the particular dimensions and configurations of the collar 50 and setscrews 60 are selected to correspond to the configuration of the end of the visual lure 80 that inserts into the collar 50.

In the embodiment of FIG. 1, the lower end of the visual lure 80 is placed on the upper surface of the base 20, and the lock 50 is then engaged with the visual lure 80 at a location above the lower end of the visual lure 80. The column 40 thus serves to rigidly secure the bottom of the visual lure 80 in position on the base 20. The lower end of the visual lure 80 may be secured similarly in the embodiment of FIG. 2. In this instance, the spring that forms the column 40 simply serves to rigidly support the lower end of the visual lure 80, since engagement of the lower end of the visual lure 80 with the bottom of the spring column 40 stiffens the spring column 40 and prevents it from flexing. Alternatively, the visual lure 80 may be positioned such that its lower end is spaced above the upper surface of the base 20 by any desired distance. When visual lure 80 is secured in this manner, the length of the spring column 40 above the base 20 and below the lower end of the visual lure 80 provides a degree of flexibility to the mounting of the visual lure 80. In this manner, the visual lure 80 will "give" when the deer in engages it, which provides an added degree of stimulation or movement that can hold a deer's interest. To provide a relatively small degree of flexibility of the visual lure 80, the lower end of the visual lure 80 is positioned relatively close to the upper end of the base 20. To increase the amount of flexibility of the visual lure 80, the lower end of the visual lure 80 is moved outwardly away from the base 20 and toward the lock 50. The length of the visual lure 80 contained within the spring column 40 functions to stiffen the spring column 40, such that the stiffness of the spring column 40 is controlled by the closeness of the lower end of the visual lure 80 to the upper surface of the base 20.

Still referring to FIGS. 1 and 2, the locks 50 of these embodiments are configured for tool-less operation. In these particular embodiments, the setscrews 60 are shown as being thumbscrews that can be tightened and loosened by hand. In another embodiment, the setscrews 60 have knobs that can be tightened and loosened by hand. In yet other embodiments, the lock 50 includes a camlock, a constricting band, or other suitable hardware, that is used to selectively secure the visual lure 80 into the lock 50. The lock 50 may also include collar 55 and nails or screws are driven through the holes of the collar and into the visual lure 80 to retain it in the device 10.

Still referring to FIGS. 1 and 2, in the complete assemblage of these embodiments, a lower end of the visual lure 80 is held concentrically in the lock 50. The visual lure 80 preferably stands substantially upright and has any desired height, which may be least about four feet tall. The particular height of the visual lure 80 is selected based on the end-use location of the device 10. For example, when the device 10 is placed in an open field and relatively far from, e.g., trees or other tall habitat structures, the visual lure 80 may be relatively taller to ensure that is can be seen from far distances. When the visual lure 80 is placed within a tree-crowded woods habitat and near a deer trail, the visual lure 80 can be relatively shorter because the deer will not have to see it from such far distances. In this situation, a shorter visual lure 80 amongst tall trees may blend in less with the surrounding trees, thereby making the visual lure 80 more visually conspicuous in this particular setting.

Referring now to FIG. 2, in this embodiment, the visual lure 80 is a sapling or tree, noting that in other embodiments, a tree-like version of the visual lure 80 is a branch or other portion of a tree, a replica of a tree, and a replica of a portion of a tree. Preferably, the trees or portions of trees have been recently cut and are fresh, for example still having their leaves.

Referring again to FIGS. 1 and 2, regardless of the particular configuration of the visual lure 80, it serves as not only visually enticing deer to approach it, but also as a holding substrate for the scent carrier 12, 14. In use, the scent carrier 12, 14 is applied to the lure 80 so that the scent carrier 12, 14 and lure 80 cooperate with each other to present a scent that is detectable and intriguing to deer for an extended period of time. The period of time is preferably, for example, four hours, eight hours, twelve hours, or more, depending on the particular composition of the scent carrier 12, 14.

Still referring to FIGS. 1 and 2, in some embodiments, the scent carrier 12, 14 may resemble or be made from deer-specific tissues, secretions, or fluids. These may include deer glandular secretions, pheromones, urine, and/or others. In other embodiments, the scent carrier 12, 14 may resemble or be made from a non-deer-specific materials. For example, the scent carrier 12, 14 may be or resemble the scent of a foodstuff that is either native or alternatively foreign to the particular habitat in which the device 10 is being used. Regardless, the scent carrier 12, 14 is configured to encourage deer to leave their own scent(s) scent marking and/or licking the scent carrier 12, 14 from the visual lure 80. This may encourage further investigation of the visual lure 80 by other deer. Such other deer may also be enticed into scent marking and/or licking the visual lure. This activity may continue over time so that the device 10 serves as, for example, an auto-regenerating communal scent post.

It should be understood, of course, that the foregoing relates to exemplary embodiments of the invention and that modifications may be made without departing from the spirit and scope of the invention as set forth in the following claims.

Various alternatives and embodiments are contemplated as being within the scope of the following claims particularly pointing out and distinctly claiming the subject matter regarded as the invention.

What is claimed:

1. A method of attracting deer to a visual lure comprising an upright sapling or tree branch of substantially natural tree appearance comprising:
   placing said visual lure comprising the upright sapling or tree branch in a transversely flexible but releasable holder to hold said sapling or tree branch in an upright position but to allow bending toward the ground and then restoration of said visual lure to the upright position;
   attaching said holder to the ground;
   placing a deer attracting scent upon said sapling or tree branch to attract deer to both play with said tree branch or sapling lure, and to leave their own scent upon said visual tree branch or sapling, wherein the deer attracting scent is selected from the group consisting of glandular secretions, a pheromone, and urine.

2. The method of claim 1 wherein the method includes a step of allowing deer to place their own scent upon the sapling or tree branch to provide an auto regenerating communal scent post.

3. The method of claim 1 wherein the deer attracting scent is periodically renewed or freshened.

\* \* \* \* \*